(12) United States Patent
Perritt, Jr.

(10) Patent No.: US 12,725,823 B1
(45) Date of Patent: Sep. 1, 2026

(54) ACOUSTICALLY CONTROLLED RHEOLOGICAL VALVE FOR THIXOTROPIC FLUID FLOW CONTROL

(71) Applicant: Henry Hardy Perritt, Jr., Charlottesville, VA (US)

(72) Inventor: Henry Hardy Perritt, Jr., Charlottesville, VA (US)

(*) Notice: Subject to any disclaimer, the term of this patent is extended or adjusted under 35 U.S.C. 154(b) by 0 days.

(21) Appl. No.: 19/651,768

(22) Filed: Apr. 19, 2026

Related U.S. Application Data

(62) Division of application No. 19/419,014, filed on Dec. 14, 2025, now Pat. No. 12,665,212.

(51) Int. Cl.
*H01M 8/0438* (2016.01)
*H01M 8/18* (2006.01)
*H01M 50/70* (2021.01)

(52) U.S. Cl.
CPC ......... *H01M 8/188* (2013.01); *H01M 8/0438* (2013.01); *H01M 50/70* (2021.01); *H01M 2300/0025* (2013.01); *H01M 2300/0082* (2013.01); *H01M 2300/0085* (2013.01); *H01M 2300/0091* (2013.01)

(58) Field of Classification Search
CPC ................. H01M 8/188; H01M 50/70; H01M 2300/0085; H01M 2300/0082; H01M 2300/0025; H01M 8/0438; H01M 2300/009
See application file for complete search history.

(56) References Cited

U.S. PATENT DOCUMENTS

| | | | | |
|---|---|---|---|---|
| 8,646,479 | B2 | 2/2014 | Jaeb | |
| 10,074,873 | B2 * | 9/2018 | Garsuch | H01M 10/0525 |
| 10,480,670 | B2 | 11/2019 | Hayashi | |
| 2001/0035509 | A1 | 11/2001 | Chase | |

(Continued)

FOREIGN PATENT DOCUMENTS

| | | | | |
|---|---|---|---|---|
| AU | 2014262580 A1 * | 1/2016 | | F16K 99/0048 |
| EP | 0107396 A1 * | 5/1984 | | H01M 8/2484 |
| WO | WO-2024039821 A1 * | 2/2024 | | B65D 51/24 |

*Primary Examiner* — Abdallah Abulaban
*Assistant Examiner* — Amie M Ndure
(74) *Attorney, Agent, or Firm* — Henry H. Perritt, Jr.

(57) ABSTRACT

An acoustic choke provides valve functionality for thixotropic fluids without mechanical components. One or more ultrasonic transducer elements is positioned radially around a smooth bore constriction in a corrosion-resistant body. When no acoustic energy is applied, the yield stress of a thixotropic fluid occupying the bore exceeds the available driving pressure and flow is blocked. When acoustic energy is applied at sufficient intensity to generate local shear rates exceeding the yield-stress threshold, the fluid transitions from gel state to liquid state and flow proceeds under the available driving pressure. Rapid state transition provides inherent fail-safe behavior. The device eliminates sealing surfaces, moving parts, and mechanical wear from fluid control systems handling corrosive, abrasive, or particle-laden thixotropic fluids. A self-cleaning mechanism uses periodic high-intensity acoustic pulses to dislodge accumulated material. Applicable to flow battery systems, pharmaceutical processing, food manufacturing, cementitious material handling, and any application requiring corrosion-resistant, particulate-tolerant flow control.

20 Claims, 8 Drawing Sheets

(56) References Cited

U.S. PATENT DOCUMENTS

| | | | | |
|---|---|---|---|---|
| 2002/0100889 | A1 | 8/2002 | Chase | |
| 2004/0132389 | A1 | 7/2004 | Miller | |
| 2010/0259224 | A1* | 10/2010 | Zinck | H01M 10/26<br>320/137 |
| 2011/0200848 | A1* | 8/2011 | Chiang | B60L 58/27<br>429/105 |
| 2015/0040999 | A1 | 2/2015 | Vulto | |
| 2016/0365605 | A1* | 12/2016 | Garsuch | H01M 10/0565 |
| 2017/0133689 | A1* | 5/2017 | Moore | C08F 212/18 |
| 2022/0083080 | A1 | 3/2022 | Imai | |
| 2022/0252171 | A1 | 8/2022 | Armesto-Beyer | |

* cited by examiner

ACOUSTICALLY CONTROLLED RHEOLOGICAL VALVE FOR THIXOTROPIC FLUID FLOW CONTROL

CROSS-REFERENCE TO RELATED APPLICATIONS

This application is a divisional of U.S. patent application Ser. No. 19/419,014, filed 14 Dec. 2025, the disclosure of which is incorporated herein by reference in its entirety

STATEMENT REGARDING FEDERALLY SPONSORED RESEARCH OR DEVELOPMENT

Not applicable

THE NAMES OF THE PARTIES TO A JOINT RESEARCH AGREEMENT

Not applicable

INCORPORATION-BY-REFERENCE OF MATERIAL

Not applicable

STATEMENT REGARDING PRIOR DISCLOSURES BY THE INVENTOR OR A JOINT INVENTOR

Not applicable

BACKGROUND

Field of the Invention

The present disclosure relates to fluid flow control apparatus, and more particularly to a valve device that controls the flow of thixotropic fluids through acoustically-induced viscosity modulation rather than mechanical actuation. The invention is applicable to any system in which a yield-stress non-Newtonian fluid must be switched between a non-flowing gel state and a flowing liquid state without the use of moving mechanical parts, including but not limited to flow battery systems, pharmaceutical slurry delivery, industrial paste transport, cementitious material handling, food processing systems, and other applications requiring corrosion-resistant, particulate-tolerant, zero-leak flow control.

Background of the Invention

Flow control in process systems handling viscous, corrosive, or particle-laden fluids presents persistent engineering challenges. Conventional mechanical valves-ball valves, gate valves, needle valves, butterfly valves, and solenoid valves-rely on moving parts that contact the process fluid directly. When that fluid is highly corrosive, contains abrasive particulates, or exhibits non-Newtonian rheological behavior, mechanical valve performance degrades rapidly. Seal wear, particulate jamming, corrosion of seating surfaces, and clogging of valve geometries are routine failure modes. In multi-stage or cascade systems where many valves must operate in coordinated sequence, mechanical complexity multiplies these failure risks.

Thixotropic fluids—materials that exhibit time-dependent viscosity reduction under applied shear stress and recovery to a gel or semi-solid state upon cessation of stress-represent a particularly challenging class for flow control. At rest, a thixotropic fluid with sufficient yield stress is self-sealing: it will not flow under moderate applied pressure. This property is exploited in diverse applications including drilling muds, paints, cosmetic creams, pharmaceutical gels, battery slurries, and food products. However, the same yield-stress behavior that provides passive flow prevention also makes these fluids difficult to switch controllably between flow and no-flow states. Mechanical valves applied to thixotropic fluids must overcome static yield stress on opening and prevent fluid ingress into valve mechanisms on closing.

Acoustic energy-mechanical pressure waves transmitted through a fluid medium—has been used in the art primarily as an anti-settling or anti-agglomeration technique for particulate suspensions. Ultrasonic transducers attached to storage vessels or pipe walls can maintain particle distributions in suspension by disrupting the formation of particle aggregates. Acoustic streaming, the time-averaged fluid motion induced by acoustic wave propagation in a viscous medium, has been studied as a means of enhancing mass transport in electrochemical cells and microfluidic devices. However, the use of acoustically-induced viscosity reduction as the sole functional mechanism of a fluid valve-replacing all mechanical actuation—has not been taught or suggested by the prior art.

The specific phenomenon exploited by the present invention is the interaction between focused ultrasonic energy and the thixotropic structure of yield-stress fluids. A thixotropic fluid maintains a three-dimensional network of interacting particles or polymers that gives it solid-like behavior below the yield stress. When acoustic energy creates shear rates exceeding the critical value required to overcome the yield stress at a localized constriction in a flow path, the network breaks down locally and rapidly, reducing viscosity by several orders of magnitude in the acoustic focal zone. When acoustic energy is removed, the network reforms within seconds, restoring the gel state and blocking flow. This acoustically-controlled gel-liquid-gel cycle is entirely reversible, requires no contact between any mechanical element and the process fluid, and has no sealing surfaces that can wear or corrode.

There exists a need in the art for a flow control device capable of switching thixotropic fluids between gel and liquid states without mechanical components, operable at low fluid velocities, compatible with corrosive and particulate-laden fluids, capable of precise flow rate modulation, and exhibiting inherent fail-safe behavior through passive re-gellation upon loss of acoustic power.

BRIEF SUMMARY

The present invention provides an acoustic choke device for controlling the flow of thixotropic fluids. In its broadest aspect, the acoustic choke comprises a smooth bore constriction forming a flow restriction in a fluid conduit, and one or more ultrasonic transducers positioned to direct focused acoustic energy into the fluid within the constriction. The device exploits the thixotropic properties of yield-stress fluids to achieve binary and proportional flow control: when acoustic energy is absent, the yield stress of the fluid exceeds the driving pressure at the constriction and flow is blocked; when acoustic energy is applied at sufficient intensity to generate shear rates exceeding the yield-stress threshold within the constriction, fluid viscosity collapses locally and flow proceeds under the available driving pressure. No moving parts contact the process fluid at any time.

In one embodiment, the constriction is a cylindrical bore of 2-5 mm diameter and 10-20 mm length, formed in a corrosion-resistant body such as polytetrafluoroethylene (PTFE), perfluoroalkoxy (PFA), or acid-resistant ceramic. The smooth bore geometry is free of seats, crevices, dead zones, and moving parts that contact the thixotropic fluid and could accumulate and block the constriction.

In another embodiment, the ultrasonic transducers are piezoelectric elements positioned radially around the exterior of the constriction body, generating focused acoustic fields within the constriction at frequencies of 20-60 kHz and acoustic intensities of 10-100 W/cm$^2$. The radial arrangement creates a focused acoustic zone that maximizes shear rate within the critical cross-section of the constriction while minimizing acoustic energy dissipated in regions outside the valve zone.

In another embodiment, the flow rate of fluid through the acoustic choke is proportional to applied acoustic power according to the relationship Q=K(P_acoustic)^1.7, where Q is volumetric flow rate in mL/s, P_acoustic is applied acoustic power in Watts, and K is a fluid-specific constant, enabling precise digital flow control through modulation of transducer drive power without any moving parts.

In another embodiment, the acoustic choke exhibits response times less than 100 milliseconds from the OFF state to the ON state upon application of acoustic energy, and passive re-closure within 1-2 seconds upon removal of acoustic energy through thixotropic recovery of the fluid. This behavior provides inherent fail-safe properties: any interruption of electrical power to the transducers causes immediate cessation of acoustic energy and subsequent passive re-gellation of the fluid, blocking flow without requiring any active closing mechanism.

In another embodiment, the acoustic choke is incorporated into a multi-stage fluid processing system in which multiple chokes are operated in coordinated sequence under computer control, enabling precise staged flow control, sequential activation patterns, and system-level flow management without mechanical valves or pumps.

A further aspect of the invention is a method for controlling the flow of a thixotropic fluid comprising: providing a constriction in a fluid conduit containing a thixotropic fluid having a yield stress; directing focused acoustic energy into the fluid at the constriction at an intensity sufficient to generate local shear rates exceeding the yield-stress threshold; and modulating the acoustic power to control the volumetric flow rate through the constriction.

Terms and Definitions

Acoustic streaming: A steady, time-averaged flow induced in a fluid by the absorption of oscillatory acoustic waves, in which momentum from high-amplitude ultrasound is transferred to the fluid to generate bulk or near-boundary flow velocities that scale with acoustic intensity.

Brunauer-Emmett-Teller (BET) surface area: A measure of specific surface area of a particulate solid, expressed in m$^2$/g, determined according to the Brunauer-Emmett-Teller adsorption method and used herein to characterize hydrophobic fumed silica employed as a rheology modifier.

Lead zirconate titanate (PZT): A piezoelectric ceramic material used in ultrasonic transducer elements, which converts electrical drive signals into mechanical vibrations that generate acoustic waves in adjacent media.

Megahertz (MHz): A unit of frequency equal to one million cycles per second, used herein to specify operating frequencies of ultrasonic devices, including flow-control transducers and rheological state sensors.

Perfluoroalkoxy alkane (PFA): A fluoropolymer material exhibiting high chemical resistance and low surface energy, suitable for use in wetted components such as constriction bodies and fluid conduits in contact with corrosive thixotropic fluids.

Polydimethylsiloxane (PDMS): A silicone-based elastomeric material commonly used in soft-lithography microfluidic devices, which can be patterned to form micro-scale channels and integrated with thin-film piezoelectric transducer elements.

Polytetrafluoroethylene (PTFE): A fluoropolymer material with high chemical and thermal stability, commonly used for chemically inert linings and valve components in contact with aggressive process fluids.

Thixotropic fluid: A fluid or semi-solid material that exhibits a reversible, time-dependent decrease in apparent viscosity when subjected to shear and recovery of viscosity when shear is reduced or removed, such that the fluid transitions from a gel-like, yield-stress state at rest to a lower-viscosity flowing state under sustained shear.

Yield stress: The minimum shear stress that must be applied to a structured or gel-like fluid before it begins to flow as a liquid, below which the material behaves as a solid-like body and does not undergo irreversible flow.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

The accompanying drawings, which are incorporated in and constitute a part of this specification, illustrate embodiments of the invention and together with the description serve to explain the principles of the invention. In the drawings.

Figure 6:
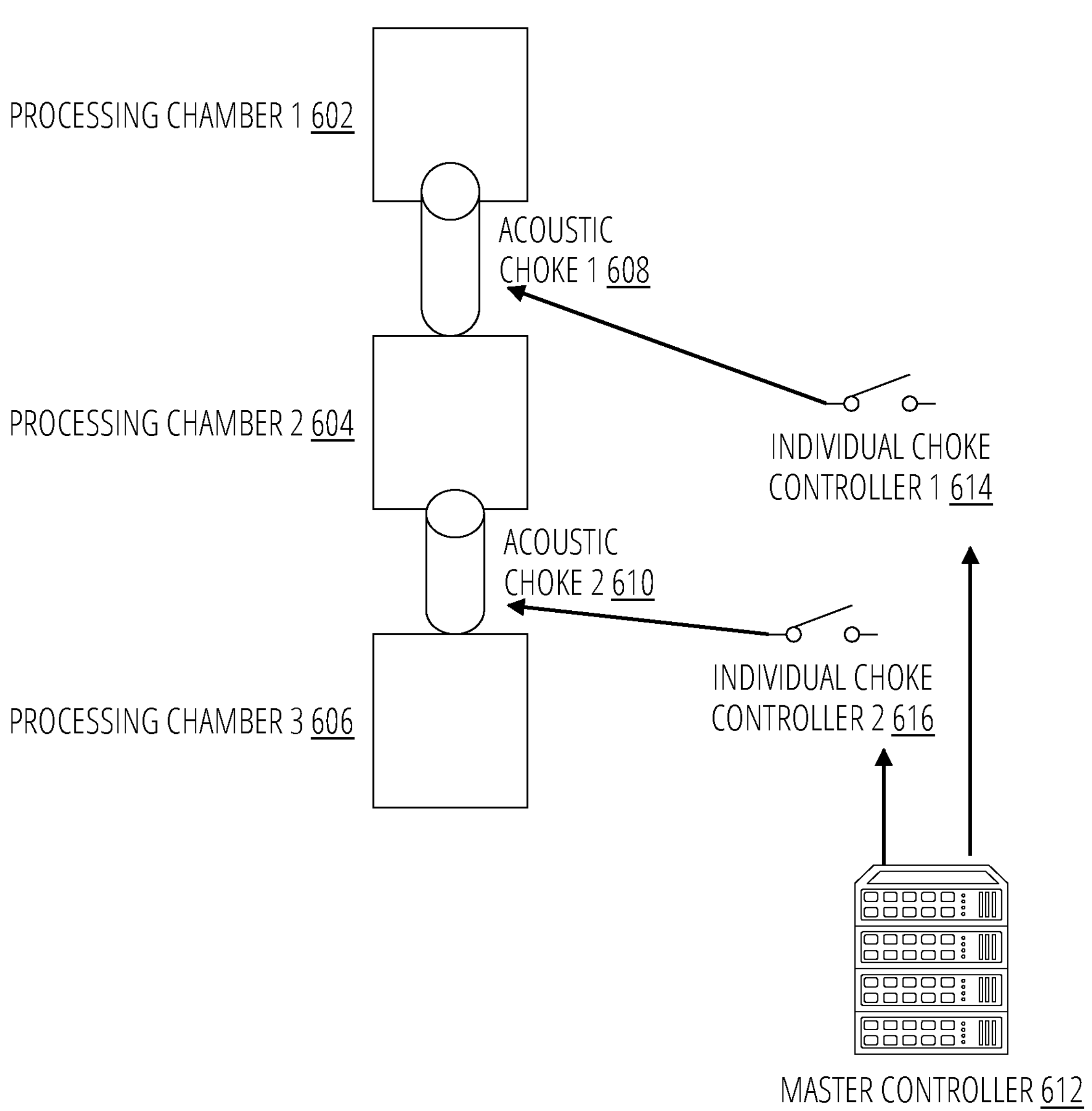

FIG. 6 is a perspective view of a multi-stage fluid processing system incorporating a plurality of acoustic chokes according to the invention, with each choke positioned between adjacent processing chambers and connected to a coordinated acoustic control system.

Figure 7:
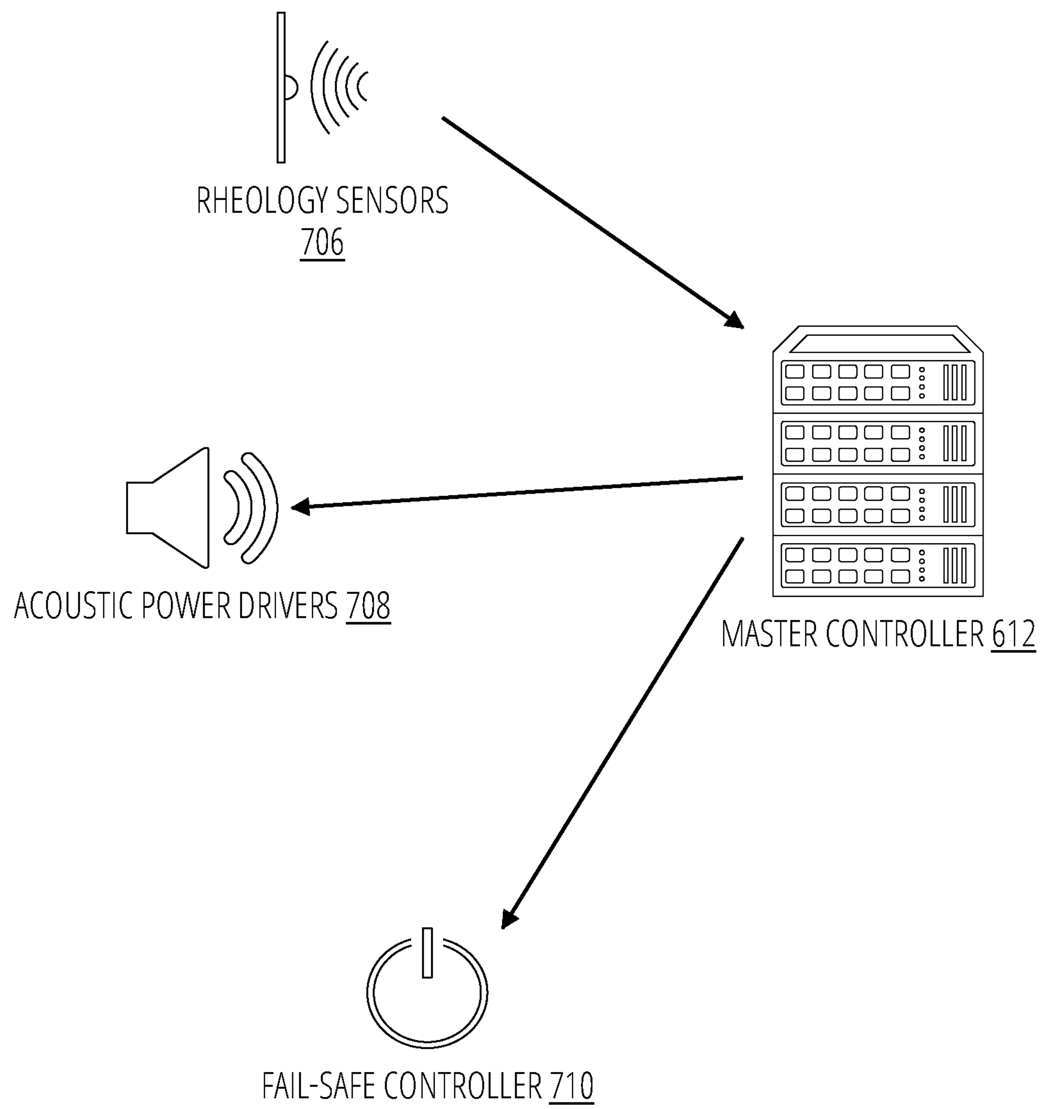

FIG. 7 is a schematic block diagram of an acoustic control system for operating a plurality of acoustic chokes in coordinated sequence, showing the master controller, individual choke controllers, rheological state sensors, and power supply architecture.

Figure 8:
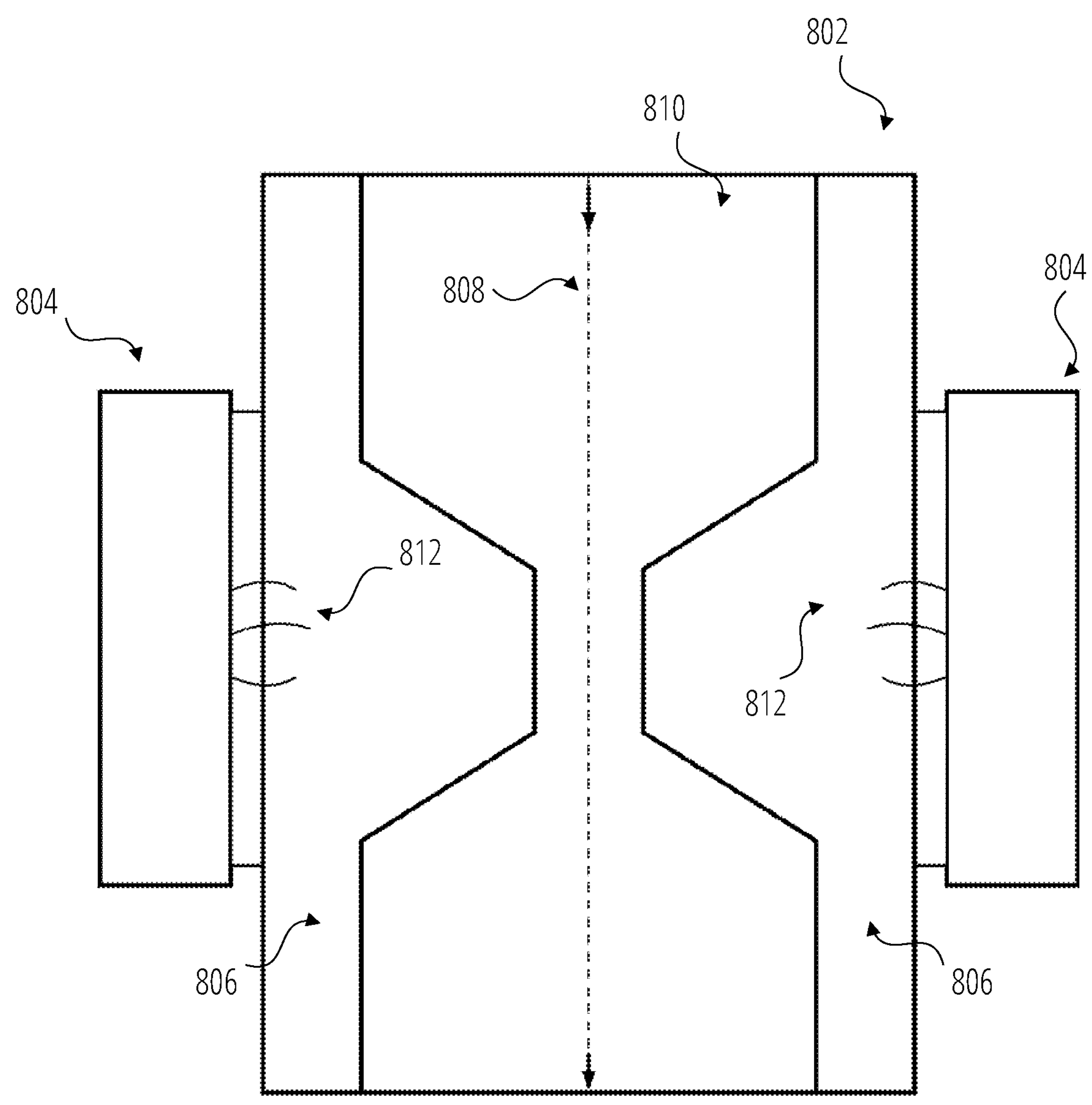

FIG. 8 is a cross-sectional view of an alternative embodiment of the acoustic choke in which the constriction body is formed of a corrosion-resistant ceramic material and the transducers are attached via an acoustic coupling layer, for use with highly corrosive process fluids.

DETAILED DESCRIPTION

I. Overview of the Acoustic Choke Principle

The acoustic choke of the present invention operates on a principle fundamentally different from all prior art flow control devices: it uses the thixotropic rheological properties of the process fluid itself as the valve element. No mechanical part contacts the fluid. No seat, plug, gate, ball, or membrane moves to open or close the flow path. Instead, the valve state—open or closed—is determined entirely by the rheological state of the fluid within the constriction: gel state means closed; liquid state means open. Acoustic energy controls which state prevails.

A thixotropic fluid possessing a yield stress to will not flow when the applied shear stress τ_applied falls below $\tau_0$. At rest in a constriction, the driving pressure P_drive produces a wall shear stress τ_wall=(P_drive·r)/(2L), where r is the constriction radius and L is the constriction length. If $\tau_0$>τ_wall, the fluid remains in gel state and blocks the constriction. This is the OFF state of the acoustic choke.

When focused acoustic energy is applied to the fluid within the constriction at intensity I sufficient to produce acoustic streaming velocity v_s=(α·I)/(ρ·c), where α is the acoustic absorption coefficient (0.1-0.2 Np/cm), ρ is fluid density, and c is sound velocity in the fluid, the resulting velocity gradient generates local shear rates $\dot{\gamma}$_local=v_s/r_focal that can exceed 1000 $s^{-1}$ within the acoustic focal zone. For a thixotropic fluid with yield stress 50-200 Pa and viscosity at high shear rate below 2 Pa·s, shear rates exceeding approximately 100 $s^{-1}$ are sufficient to collapse the gel network structure and achieve the liquid-state viscosity. Once the local shear rate exceeds the critical value, the fluid in the focal zone liquefies, the apparent viscosity drops by three to four orders of magnitude, and the existing driving pressure drives fluid through the now-liquid constriction. This is the ON state of the acoustic choke.

The transition between states is rapid and reversible. Gel network breakdown under acoustic stimulation occurs within 50-100 milliseconds of acoustic energy application, consistent with the time constant for thixotropic restructuring breakdown in fumed silica and related yield-stress systems. Re-gellation upon removal of acoustic energy occurs within 1-2 seconds, consistent with the time constant for thixotropic network recovery in these systems. Both time constants are determined by the rheology of the specific fluid employed, not by any mechanical element of the device, and can be tuned by selection of rheology modifier concentration and particle characteristics.

II. Structural Description-First Embodiment

Figure 1:
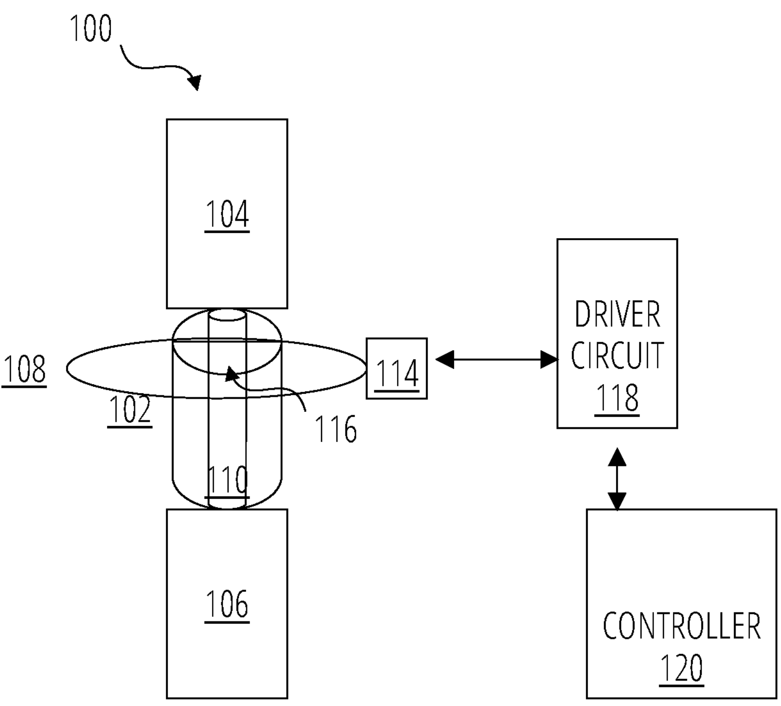
FIG. 1 is a cross-sectional elevation view of an acoustic choke according to a first embodiment of the invention, showing the constriction body, radially-positioned ultrasonic transducers, acoustic focal zone, and fluid conduit connections.

Referring to FIG. 1, the acoustic choke 100 according to a first embodiment of the invention comprises a constriction body 102, a pair of fluid conduits 104 and 106 connecting the constriction body to upstream and downstream sections of the fluid circuit, and a transducer array 108 positioned radially around the exterior of the constriction body 102.

The constriction body 102 defines a smooth bore channel 110 having a circular cross-section with an internal diameter D of 2-5 mm and an axial length L of 10-20 mm. The smooth bore geometry is essential: the absence of protrusions, grooves, steps, seats, or other geometric irregularities within the bore eliminates crevices where particulate matter in the process fluid could accumulate and cause blockage independently of the acoustic field. The smooth bore also eliminates sealing surfaces that would be subject to wear or corrosion. The constriction body 102 is fabricated from a material selected for chemical compatibility with the process fluid. For aqueous acid service, suitable materials include polytetrafluoroethylene (PTFE), perfluoroalkoxy alkane (PFA), polyvinylidene fluoride (PVDF), borosilicate glass, or acid-resistant alumina ceramic.

In a preferred embodiment, the constriction body 102 is a single piece of PFA with the bore 110 machined or injection-molded to finished dimensions, with no internal joints, threads, or seams. The outer surface of the constriction body 102 presents a cylindrical surface to which the transducer array 108 is attached, with an acoustic coupling layer 112 of compliant material such as silicone elastomer or polyurethane interposed between the transducer elements 114 and the outer surface of the constriction body 102 to maximize acoustic energy transmission into the fluid.

The transducer array 108 comprises a plurality of piezoelectric transducer elements 114 arranged in a ring around the circumference of the constriction body 102, centered axially at the midpoint of the bore 110. In the preferred embodiment, four transducer elements 114 are spaced 90 degrees apart around the circumference, although embodiments with two, three, six, or eight elements are also within the scope of the invention. The radial arrangement directs acoustic energy inward toward the central axis of the bore, creating a focused acoustic zone 116 at or near the bore axis. The focused zone 116 exhibits the highest acoustic pressure amplitude and correspondingly the highest acoustic streaming velocity and shear rate in the fluid.

Each transducer element 114 is electrically connected to a driver circuit 118 that supplies an alternating current at the operating frequency. The driver circuit 118 is in turn connected to a controller 120 that regulates the power delivered to each transducer element 114. By varying the power delivered to the transducer array, the controller 120 adjusts the acoustic intensity in the focal zone 116, thereby controlling the extent of viscosity reduction in the fluid and, through the flow-rate relationship described below, the volumetric flow rate through the choke 100.

The fluid conduits 104 and 106 connect the upstream and downstream fluid circuits to the bore 110 through smooth transitions that avoid abrupt changes in cross-section. The upstream conduit 104 diameter is typically larger than the bore 110 diameter by a factor of two to five, providing a pressure head that drives flow through the bore 110 when the acoustic choke is in the ON state. The downstream conduit 106 may be the same diameter as the upstream conduit 104 or may be sized differently depending on the requirements of the downstream circuit.

III. Flow Rate Modulation and Digital Control

The acoustic choke enables three distinct modes of flow control through modulation of the transducer drive signal.

In binary ON/OFF mode, the transducer is driven at a fixed power P_acoustic>P_threshold to achieve full flow and at zero power for no flow. This mode is suitable for applications requiring simple start/stop flow control with rapid switching.

In proportional mode, the drive power P_acoustic is set to values between P_threshold and P_max to achieve intermediate flow rates according to Equation 1. Because P_acoustic appears as a continuously adjustable parameter in the control system, proportional mode enables analog flow control without any mechanical positioning mechanism.

In pulse-width modulation (PWM) mode, the transducer is switched between P_max and zero at a frequency much higher than the inverse of τ_close, so that the fluid remains partially liquefied throughout the duty cycle. The effective viscosity in the bore is then a time-averaged function of the duty cycle, and the time-averaged flow rate is proportional to the duty cycle fraction. PWM mode enables precise flow control using digital electronics without requiring analog power regulation.

The controller 120 may implement any of these modes under software control and may switch dynamically between modes in response to feedback signals from flow sensors, pressure transducers, or rheological state sensors positioned in the fluid circuit.

Figure 2A:
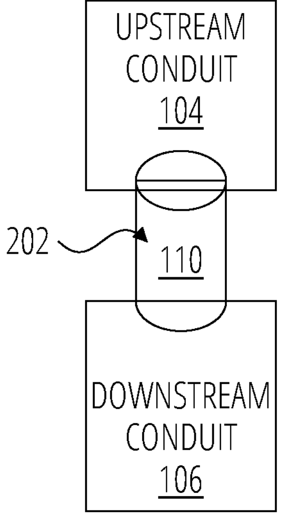
FIG. 2A is a cross-sectional view of the acoustic choke of FIG. 1 in the OFF state, illustrating the thixotropic fluid in gel form occupying and blocking the constriction, with no acoustic energy applied.

FIG. 2A is a cross-sectional view of the of FIG. 1 choke 100, with its upstream conduit 104, downstream conduit 106, and smooth bore channel 110 in the OFF state, with no acoustic energy applied. The thixotropic fluid is in gel 202 form occupying and blocking the smooth bore channel 110.

Figure 2B:
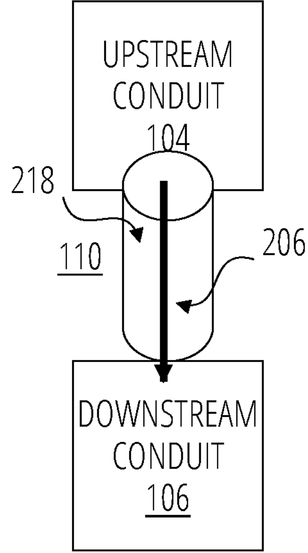
FIG. 2B is a cross-sectional view of the acoustic choke of FIG. 1 in the ON state, illustrating the localized liquefaction zone within the constriction upon application of acoustic energy at sufficient intensity, with the gel regions upstream and downstream of the focal zone indicated.

FIG. 2B is a cross-sectional view of the acoustic choke of FIG. 1 in the ON state, illustrating the localized liquefaction zone within the constriction upon application of acoustic energy at sufficient intensity, with the gel regions upstream and downstream of the focal zone indicated. The smooth bore channel 110 between the upstream conduit 104 and the downstream conduit 106 has been subjected to liquefaction 218, resulting in a flow 206.

IV. Acoustic Field and Flow Characteristics

Figure 3:
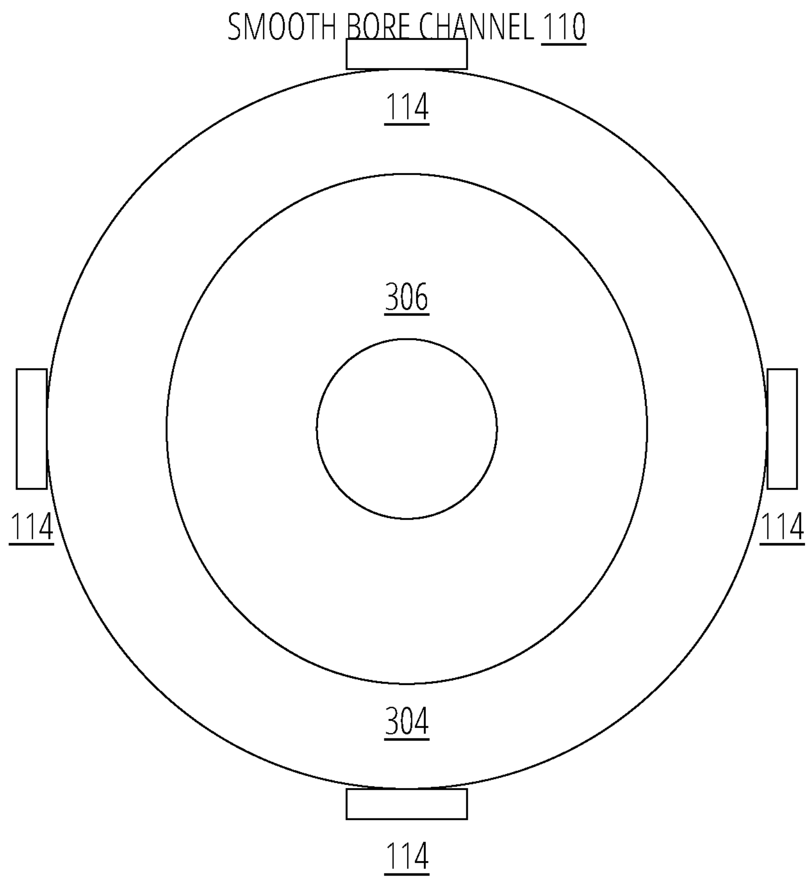
FIG. 3 is a schematic diagram of the acoustic field pattern within the constriction, showing acoustic pressure amplitude as a function of radial and axial position, with the shear rate contour corresponding to the yield-stress threshold of the thixotropic fluid superimposed.

FIG. 3 shows a plan view of the bore with a transducer array 108 comprising four radially positioned PZT transducer elements 114, surrounding smooth bore channel 110, directing acoustic energy inward. The result is an acoustic pressure gradient 304, and a critical shear rate contour 306. The acoustic pressure gradient comprises an amplitude field P(r,z), falling off from maximum at the geometric focus on the bore axis to minimum near the bore walls. Inside the critical shear rate contour 306, where $\dot{\gamma}=\dot{\gamma}$_c, the acoustic streaming velocity is sufficient to exceed the yield-stress threshold and the fluid is in the liquid state (the "LIQ. ZONE"); outside it, shear rate falls below $\dot{\gamma}$_c and the gel state prevails, blocking flow.

The acoustic pressure amplitude within the bore 110 as a function of radial position r and axial position z exhibits a focused pattern determined by the geometry and drive frequency of the transducer array 108. The pressure amplitude P(r,z) is maximum at the geometric focus of the array and decays radially and axially away from the focus. The shear rate produced by acoustic streaming at position (r,z) is $\dot{\gamma}$(r,z)=(dv_s/dr), where v_s (r,z) is the acoustic streaming velocity field.

The critical shear rate contour $\dot{\gamma}=\dot{\gamma}$_c, where $\dot{\gamma}$_c is the minimum shear rate required to liquefy the thixotropic fluid (typically 100-500 $s^{-1}$ for fumed silica-modified fluids), defines the boundary of the liquefaction zone within the bore. When the applied acoustic power P_acoustic is sufficient to bring the peak shear rate $\dot{\gamma}$_max above $\dot{\gamma}$_c, a central region of the bore achieves liquid-state viscosity. The radial extent of the liquefaction zone increases with increasing acoustic power, providing a mechanism for proportional flow control: at low acoustic power, only a small axial channel of liquefied fluid exists within the bore, producing low flow rates; at high acoustic power, the liquefaction zone extends to the bore wall and maximum flow rates are achieved.

Figure 4:
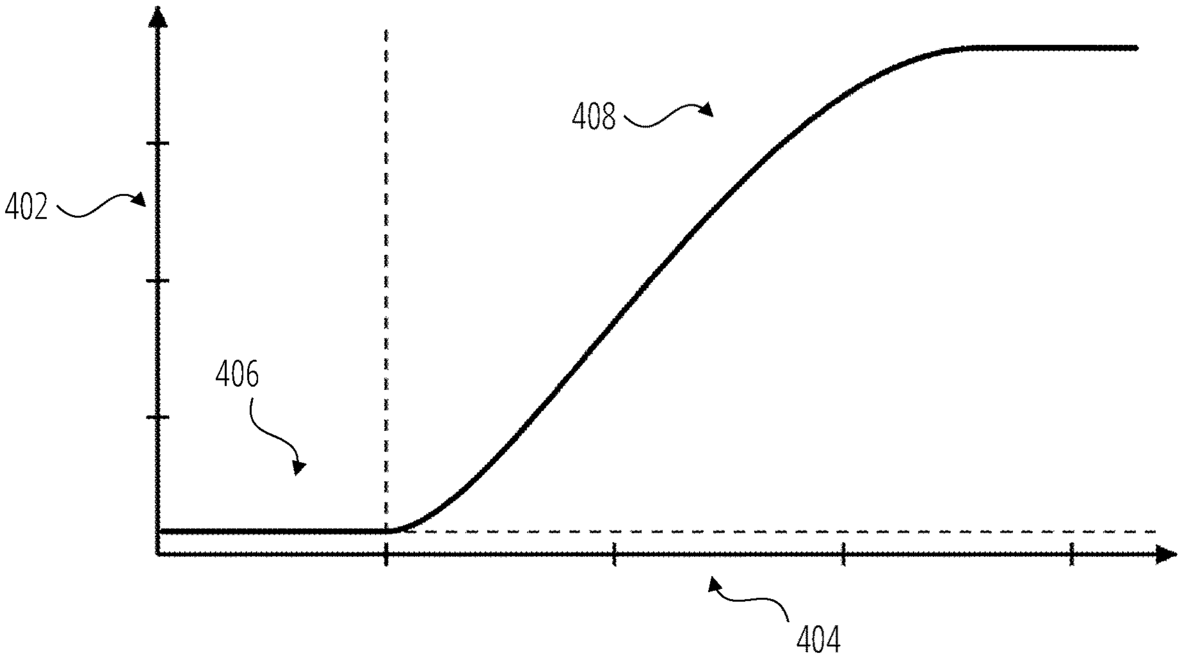
FIG. 4 is a graph of volumetric flow rate Q as a function of applied acoustic power P_acoustic for a representative thixotropic fluid, illustrating the power-law relationship Q=K(P_acoustic)^1.7 and the threshold power below which no flow occurs.

FIG. 4 shows the flow rate 402, as a function of acoustic power 404. It shows a no flow region 406, and an increasing flow 408.

Volumetric flow rate Q through the acoustic choke as a function of applied acoustic power P_acoustic follows the empirical power-law relationship:

$$Q=K(P\_acoustic)\hat{}1.7,$$

where Q is in mL/s, P_acoustic is in Watts, and K is a fluid-specific constant with units of mL/(s·W^1.7). For a thixotropic fluid comprising 2-4 M cerium methanesulfonate in methanesulfonic acid or aqueous acid solution modified with 0.5-2 wt % hydrophobic fumed silica (BET surface area 110-130 $m^2$/g), the constant K equals approximately 0.15 mL/(s·W$\dot{\gamma}$1.7) at 25° C. The power-law exponent of 1.7 reflects the nonlinear relationship between acoustic streaming velocity and shear-thinning viscosity reduction in thixotropic fluids. This relationship enables precise digital flow control through pulse-width modulation or amplitude modulation of the transducer drive signal.

The threshold power P_threshold below which no flow occurs corresponds to the acoustic power required to produce the critical shear rate $\dot{\gamma}$_c at the bore axis. For the fluid composition described above with a bore diameter of 3.5 mm, P_threshold is approximately 2 W at 40 kHz. Below this threshold, the gel-state yield stress throughout the bore exceeds the available driving pressure and the choke remains fully closed.

V. Temporal Response Characteristics

Figure 5:
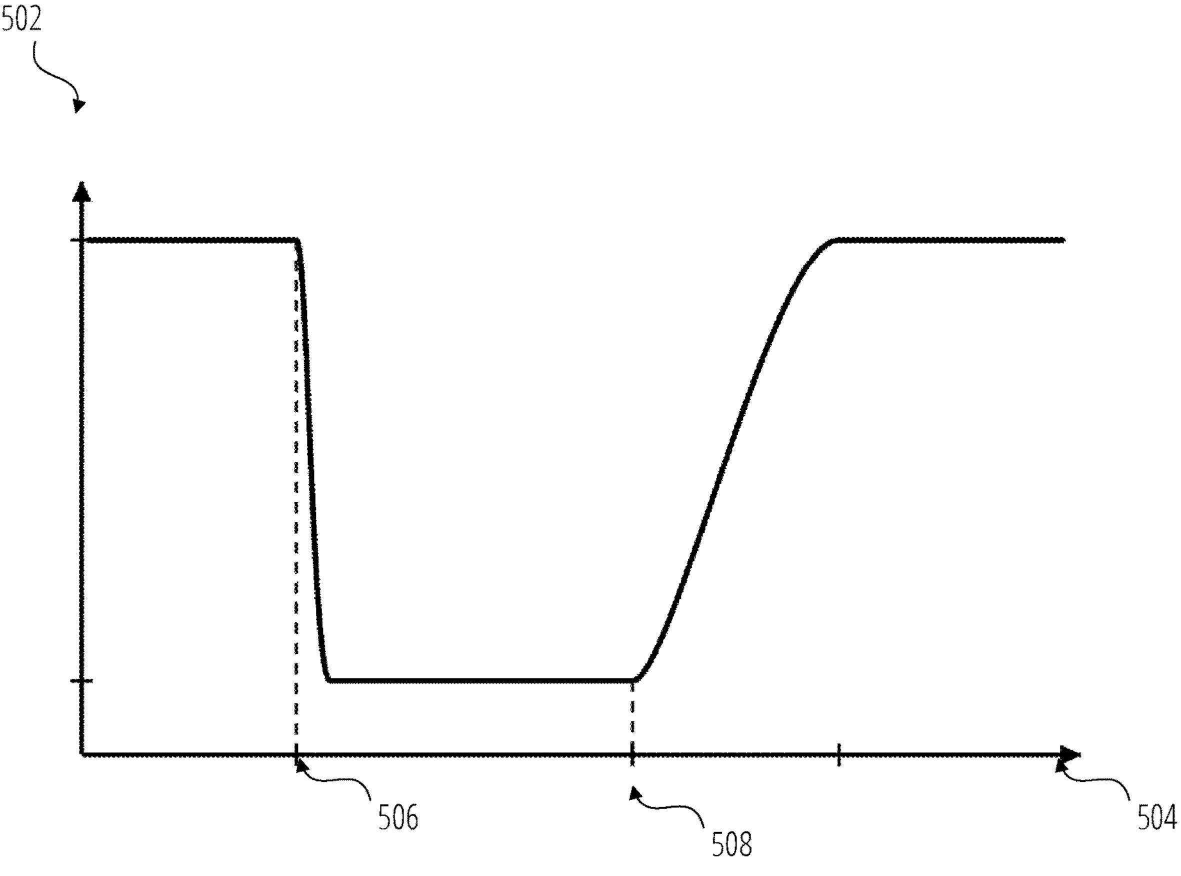
FIG. 5 is a graph of apparent fluid viscosity as a function of time at the constriction center, showing the rapid viscosity collapse upon acoustic energy application (less than 100 milliseconds) and the recovery to gel-state viscosity upon cessation of acoustic energy (1-2 seconds).

FIG. 5 depicts viscosity 502 as a function of time 504, showing the effect of acoustic on 506, and acoustic off 508. The viscosity 502 of the thixotropic fluid at the center of the bore exhibits a characteristic time-dependent response to acoustic energy application and removal. Upon application of acoustic energy (acoustic on 506) at power P_acoustic>P_threshold, the viscosity at the bore center decreases from its rest gel-state value (typically exceeding 1000 Pa·s) to its high-shear liquid-state value (typically 0.5-2 Pa·s) within a transition time τ_open of less than 100 milliseconds. This rapid opening response is governed by the kinetics of acoustic-induced gel network breakdown in the thixotropic fluid.

Upon removal of acoustic energy (acoustic off 508), the fluid at the bore center recovers from liquid-state to gel-state viscosity within a recovery time τ_close of 1-2 seconds. The recovery process is governed by Brownian motion-driven reassembly of the gel network structure, which proceeds at a rate determined by particle or polymer concentration, temperature, and the nature of the interparticle interactions. For fumed silica-modified aqueous fluids at concentrations of 0.5-2 wt %, recovery times of 1-2 seconds have been observed.

The asymmetry between τ_open (<100 ms) and τ_close (1-2 s) is an intrinsic property of thixotropic fluids: acoustic breakdown of the gel network is driven by the mechanical energy of the acoustic field and is therefore faster than the diffusion-limited re-assembly that occurs passively after field removal. This asymmetry is generally desirable in valve applications, as it provides rapid opening response while the slower closing response prevents pressure transients associated with abrupt valve closure.

Importantly, the closing behavior is passive and fail-safe by nature. If electrical power to the transducer array is interrupted for any reason, the acoustic field ceases immediately, and the fluid begins re-gelling within the bore. The fail-safe controller configured to command all acoustic chokes to an OFF state by interrupting electrical power to all transducer elements upon detection of a system fault condition, whereby passive thixotropic recovery of the thixotropic fluid in each smooth bore channel returns all acoustic chokes to their normally-closed, gel-state condition. After the recovery time τ_close has elapsed, the choke has returned to the fully closed OFF state without any active control signal or mechanical actuation. This inherent fail-safe behavior is a significant advantage over mechanical valves, which may fail in the open position upon power loss.

VI. Multi-Choke System Embodiment

FIG. 6 depicts a multi-choke system embodiment comprising a processing chamber 1 602, a processing chamber 2 604, a processing chamber 3 606, an acoustic choke 1 608 connecting processing chamber 1 602 and processing chamber 2 604, an acoustic choke 2 610 connecting processing chamber 2 604 and processing chamber 3 606, and a master controller 612. It should be understood that that FIG. 6 shows only three of a plurality of processing chambers and acoustic chokes, which may comprise larger numbers of acoustic chokes positioned between adjacent A multi-stage fluid processing system incorporates a plurality of acoustic chokes positioned between adjacent processing chambers in a series configuration. The system is applicable to any process requiring staged transport of a thixotropic fluid through a series of treatment, reaction, or analysis stages, including flow battery systems, staged chemical reactors, cascade extraction columns, and multi-stage filtration systems.

Each acoustic choke 100 in the multi-stage system (acoustic choke 1 608 and acoustic choke 2 610 in FIG. 6) is connected to an individual choke controller (individual choke controller 1 614 and individual choke controller 2 616 in FIG. 6) that regulates the acoustic power delivered to that choke's transducer array. The individual choke controllers receive instructions from a master controller 612 that coordinates the operation of all chokes in the system. The master controller 612 may implement sequential activation patterns, simultaneous activation of selected subsets of chokes, or any other control strategy required by the process.

Referring to FIG. 7, the control system architecture for the multi-choke system comprises the master controller 612, which may be a programmable logic controller, microcontroller, or general-purpose computer running control software; individual acoustic power drivers 708, one per choke, each capable of delivering up to 100 W to the transducer array; rheology sensors 706, such as ultrasonic viscometers operating at 1 MHz (distinct from the 40 kHz flow control frequency), positioned in the fluid conduits adjacent to each choke to provide real-time viscosity feedback; flow sensors positioned downstream of each choke to confirm actual flow rates; and a fail-safe controller 710 with isolated power supply that monitors system status and can override the master controller to command all chokes to the OFF state in emergency conditions.

The sequential activation pattern implemented by the master controller 612 in a gravity-fed cascade system activates chokes in order from top to bottom of the cascade, with a time delay between successive activations set to allow the fluid slug released by each choke to reach the downstream chamber before the next choke is activated. This sequential pattern creates a controlled wave of fluid flow through the cascade, optimizing flow distribution and minimizing pressure transients. sequential pattern from a first end to a second end of the series flow path, creating a controlled wave of fluid flow through the fluid processing chambers while maintaining all acoustic chokes in a normally-closed state in the absence of applied acoustic energy

VII. Alternative Embodiments

Referring to FIG. 8, an alternative embodiment of the acoustic choke employs a ceramic constriction body 802 formed of acid-resistant alumina ceramic ($Al_2O_3$, 99.5% purity) for service with highly corrosive process fluids such as concentrated sulfuric acid, hydrofluoric acid, or strong oxidizing acids. The ceramic body 802 provides superior chemical resistance compared to fluoropolymer materials while maintaining the smooth bore geometry required for clog-free operation. Piezoelectric transducer elements 804 emitting acoustic signals 812 are attached to the exterior of the ceramic body via an acoustic coupling layer 806 of borosilicate glass frit, which provides a rigid acoustic coupling capable of transmitting high acoustic intensities without mechanical degradation.

In another alternative embodiment, the transducer array comprises a single cylindrical piezoelectric element surrounding the full length of the constriction bore, rather than a plurality of discrete elements. The cylindrical element generates a radially symmetric acoustic field that is uniform along the bore axis, which may be advantageous for certain fluid compositions or bore geometries.

In another alternative embodiment, the constriction bore is not circular in cross-section but is instead formed with an elliptical, rectangular, or annular cross-section, to accommodate specific flow circuit requirements or to match the cross-sectional geometry of adjacent conduit components.

In another alternative embodiment, the acoustic choke is incorporated into a microfluidic chip fabricated in PDMS, glass, or silicon, with the constriction formed by photolithography at channel dimensions of 10-1000 micrometers and the transducer element integrated onto the chip substrate by thin-film piezoelectric deposition. This embodiment is applicable to laboratory-scale thixotropic fluid handling, point-of-care diagnostic devices, and organ-on-chip platforms.

VIII. Self-Cleaning Mechanism

The smooth bore geometry of the constriction body 102 eliminates the principal cause of mechanical valve clogging: entrapment of particles in valve seat geometries, threads, or stem seals. However, even in a smooth bore, long-term operation with particle-laden thixotropic slurries may result in gradual accumulation of consolidated material at the bore entrance or within the bore itself, particularly in regions of low acoustic energy density near the bore ends.

The acoustic choke provides a self-cleaning mechanism through periodic application of high-intensity acoustic pulses. By driving the transducer array at maximum power (P_max>100 W instantaneous peak, 1 second duration) at intervals determined by the control system, acoustic cavitation can be induced within the bore. Cavitation generates local pressure impulses on the order of several megapascals for microsecond durations, which are sufficient to dislodge any consolidated material adhering to the bore wall. The dislodged material is then carried out of the bore by the flow of liquefied fluid during the high-power pulse. This self-cleaning mechanism is entirely automated and requires no disassembly or manual intervention.

The energy consumption of the acoustic choke during normal flow control operation is low relative to mechanical alternatives. At typical operating powers of 1-5 W per choke and duty cycles of 20-80%, the acoustic choke consumes less than 5 W average electrical power per valve, representing a parasitic loss of less than 0.5% relative to mechanical pumping in equivalent flow circuit applications.

I claim:

1. An acoustic choke for controlling a flow of a thixotropic fluid, comprising:

a constriction body defining a smooth bore channel forming a flow restriction in a fluid conduit, the smooth bore channel having no mechanical member configured to move within the smooth bore channel to open or close the flow restriction;

one or more ultrasonic transducer elements positioned exterior to the constriction body and arranged to direct focused acoustic energy into the smooth bore channel; and a driver circuit electrically connected to the one or more ultrasonic transducer elements and configured to supply alternating current at an operating frequency to generate the focused acoustic energy;

wherein the smooth bore channel is dimensioned relative to an available driving pressure in the fluid conduit and to a yield stress of the thixotropic fluid such that, when no acoustic energy is applied, a wall shear stress produced at the bore by the available driving pressure is less than the yield stress of the thixotropic fluid, the thixotropic fluid within the smooth bore channel remains in a gel state, and flow through the smooth bore channel is blocked to provide a normally-closed, zero-flow state; and wherein, when acoustic energy is applied at an intensity sufficient to generate local shear rates within the smooth bore channel exceeding a yield-stress threshold of the thixotropic fluid, the thixotropic fluid within at least a portion of the smooth bore channel transitions from the gel state to a liquid state of substantially reduced viscosity, and the available driving pressure drives flow of the thixotropic fluid through the smooth bore channel without movement of any mechanical member within the bore.

2. The acoustic choke of claim 1, wherein said smooth bore channel has a circular cross-section with an internal diameter in a range of 2-5 mm and an axial length in the range of 10-20 mm, the dimensions being selected such that, in combination with an available driving pressure and a yield stress of the thixotropic fluid, a wall shear stress at the smooth bore channel is less than the yield stress in the absence of applied acoustic energy, thereby maintaining a normally-closed, zero-flow state.

3. The acoustic choke of claim 1, wherein said one or more ultrasonic transducer elements comprise a plurality of piezoelectric elements arranged radially around a circumference of said constriction body, centered axially at a midpoint of said smooth bore channel, to create a focused acoustic zone at or near a central axis of the bore channel in which local shear rates exceed a yield-stress threshold of the thixotropic fluid during operation.

4. The acoustic choke of claim 1, wherein said operating frequency is in a range of 20-60 kHz and is selected to produce acoustic streaming within the thixotropic fluid sufficient to generate shear rates in the bore channel exceeding 100 $s^{-1}$ in an ON state.

5. The acoustic choke of claim 1, wherein said driver circuit is configured to supply acoustic intensity to the smooth bore channel in a range of 10-100 $W/cm^2$, producing acoustic streaming velocities exceeding 10 cm/s and shear rates exceeding 1,000 $s^{-1}$ within the bore channel when the acoustic choke is in an ON state.

6. The acoustic choke of claim 1, wherein transition from gel state to liquid state upon application of acoustic energy occurs within 100 milliseconds, and recovery from liquid state to gel state upon cessation of the acoustic energy occurs within 1-2 seconds solely through passive thixotropic recovery of the thixotropic fluid, thereby providing a rapidly opening and passively, fail-safe closing valve without movement of any mechanical member within the smooth bore channel.

7. The acoustic choke of claim 1, wherein volumetric flow rate Q of fluid through said smooth bore channel is related to applied acoustic power P_acoustic according to the relationship $Q=K(P\_acoustic)^{1.7}$, where K is a fluid-specific constant, such that modulation of acoustic power by the driver circuit provides proportional flow control without mechanical actuation.

8. The acoustic choke of claim 1, wherein said constriction body is fabricated from a material selected from the group consisting of polytetrafluoroethylene, perfluoroalkoxy alkane, polyvinylidene fluoride, borosilicate glass, and alumina ceramic, and wherein each such material provides a chemically inert, smooth bore surface free of seats, crevices, and moving parts that contact the thixotropic fluid.

9. The acoustic choke of claim 1, wherein said driver circuit is further configured to deliver periodic high-intensity acoustic pulses at a power exceeding 100 W for durations of approximately 1 second, inducing acoustic cavitation within said smooth bore channel to dislodge accumulated material from the wall of the smooth bore channel and thereby provide a self-cleaning function without mechanical disassembly.

10. The acoustic choke of claim 1, wherein said thixotropic fluid comprises an aqueous acid solution modified with 0.5-2 wt % hydrophobic fumed silica having a BET surface area of 110-130 $m^2/g$, the thixotropic fluid exhibiting a yield stress of 50-200 Pa at rest and an apparent viscosity below 2 Pa·s under acoustic activation in the smooth bore channel.

11. The acoustic choke of claim 1, wherein said driver circuit operates in a pulse-width modulation mode in which acoustic energy is applied at a switching frequency exceeding an inverse of a gel-state recovery time of the thixotropic fluid, such that the thixotropic fluid within the smooth bore channel remains in a partially liquefied state throughout a duty cycle and a time-averaged flow rate is proportional to a duty-cycle fraction.

12. The acoustic choke of claim 1, further comprising one or more acoustic coupling layers of compliant material interposed between said ultrasonic transducer elements and an exterior surface of said constriction body to maximize acoustic energy transmission into the smooth bore channel while maintaining all solid components of the acoustic choke fixed in position during operation.

13. A method for controlling a flow of a thixotropic fluid through a fluid conduit, comprising:

providing a constriction in said fluid conduit, said constriction having a smooth bore channel with no mechanical member configured to move within the smooth bore channel to open or close the smooth bore channel;

filling said smooth bore channel with said thixotropic fluid having a yield stress and selecting a smooth bore length and diameter and an available driving pressure in the fluid conduit such that a wall shear stress at the smooth bore produced by the available driving pressure is less than the yield stress in the absence of applied acoustic energy, thereby blocking flow through the bore channel in a normally-closed state;

selectively applying focused acoustic energy to the thixotropic fluid within said bore channel at an intensity sufficient to generate local shear rates exceeding a yield-stress threshold of the thixotropic fluid having a yield stress, thereby transitioning the fluid within at least a portion of the bore channel from a gel state to a liquid state of substantially reduced viscosity and enabling flow through the bore channel under the available driving pressure without movement of any mechanical member within the bore; and selectively removing the applied acoustic energy, whereby the thixotropic fluid within the bore channel passively recovers from the liquid state to the gel state through thixotropic restructuring and flow through the bore channel is again blocked to restore the normally-closed state.

14. The method of claim 13, further comprising modulating an intensity of applied acoustic energy to control a volumetric flow rate of the thixotropic fluid through the smooth bore channel in proportion to an applied acoustic power according to a power-law relationship Q=K(P_acoustic)$^n$, where Q is volumetric flow rate, P_acoustic is the applied acoustic power, K is a fluid-specific constant, and n is greater than 1.

15. The method of claim 13, wherein applying focused acoustic energy comprises driving one or more piezoelectric transducer elements positioned radially around an exterior of said constriction at a frequency in a range of 20-60 kHz and at an acoustic intensity in a range of 10-100 W/cm$^2$, thereby generating acoustic streaming within the thixotropic fluid sufficient to produce local shear rates exceeding 1,000 s$^{-1}$ within the bore channel.

16. The method of claim 13, further comprising periodically applying acoustic energy at an intensity and duration sufficient to induce cavitation within said smooth bore channel, thereby dislodging accumulated material from a bore wall and providing a self-cleaning function without mechanical disassembly of the constriction or introduction of any moving valve component into the smooth bore channel.

17. A fluid processing system comprising:

a plurality of fluid processing chambers arranged in a series flow path;

a plurality of acoustic chokes, each acoustic choke positioned between adjacent ones of said processing chambers and each comprising a smooth bore constriction having no mechanical member configured to move within the smooth bore channel to open or close the smooth bore channel and one or more ultrasonic transducer elements positioned to direct focused acoustic energy into a thixotropic fluid within the smooth bore channel; and a control system connected to the ultrasonic transducer elements of each of said acoustic chokes and configured to apply acoustic energy selectively to individual ones of said acoustic chokes to control flow of the thixotropic fluid through the series flow path;

wherein the thixotropic fluid flows between adjacent fluid processing chambers only when acoustic energy is applied to the intervening acoustic choke at sufficient intensity to transition the thixotropic fluid within the bore from a gel state to a liquid state and thereby permit flow under an available driving pressure, and flow is blocked when the focused acoustic energy is absent through passive gel-state recovery of the thixotropic fluid within the bore to provide a normally-closed state without movement of any mechanical member in the smooth bore channel.

18. The system of claim 17, wherein said control system is configured to activate said acoustic chokes in a sequential pattern from a first end to a second end of the series flow path, creating a controlled wave of fluid flow through the fluid processing chambers while maintaining the acoustic chokes in a normally-closed state in the absence of applied acoustic energy.

19. The system of claim 17, wherein said control system further comprises a fail-safe controller having an isolated power supply, said fail-safe controller configured to command all acoustic chokes to an OFF state by interrupting electrical power to all transducer elements upon detection of a system fault condition, whereby passive thixotropic recovery of the thixotropic fluid in each smooth bore channel returns all acoustic chokes to their normally-closed, gel-state condition.

20. The system of claim 17, wherein the series flow path is a gravity-fed cascade in which said fluid processing chambers are arranged at descending elevations and gravity provides a driving pressure for fluid flow through each acoustic choke when in an ON state, and wherein each acoustic choke is dimensioned relative to a yield stress of the thixotropic fluid and a gravity-induced pressure head such that the yield stress exceeds a wall shear stress at the smooth bore channel in the absence of applied acoustic energy, thereby maintaining a normally-closed state under gravity alone.

* * * * *